United States Patent Office 3,775,485
Patented Nov. 27, 1973

3,775,485
PRODUCTION OF HYDROXYARYL THIOETHERS
Kurt H. Pilgram, Modesto, Calif., Dirk Medema, Amsterdam, Netherlands, and Samuel B. Soloway and George W. Gaertner, Jr., Modesto, Calif., assignors to Shell Oil Company, New York, N.Y.
No Drawing. Original application Sept. 14, 1970, Ser. No. 72,163, now Patent No. 3,732,317. Divided and this application Feb. 8, 1973, Ser. No. 330,832
Int. Cl. C07c *149/36*
U.S. Cl. 260—609 F                3 Claims

ABSTRACT OF THE DISCLOSURE

Hydroxyaryl thioethers are prepared by first preparing a phenyl sulfonium bisulfate—either directly by reacting a phenol with dimethyl sulfoxide in sulfuric acid or stepwise by reacting an organic sulfide with chlorine in sulfuric acid to form a chloro-sulfonium bisulfate and reacting this crude reaction mixture with a phenol—then reacting the crude reaction mixture containing the phenyl sulfonium bisulfate with water containing halide ions to effect formation of the thioether. Nitration of the intermediate phenyl sulfonium bisulfate thus prepared can be effected using nitric acid and optionally additional sulfuric acid without the isolating of any intermediate products. Novel intermediates are also prepared via this method.

BACKGROUND OF THE INVENTION

This is a division of application Ser. No. 72,163, filed Sept. 14, 1970 now U.S. Pat. 3,732,317 issued May 8, 1973.

Scope of the invention.—Hydroxyaryl thioethers have numerous uses some of which are described in U.S. Pats. 3,282,979 and 3,274,257. In addition to those uses these compounds are valuable as intermediates in the preparation of biologically active agents such as herbicides. The intermediate sulfonium salts prepared according to this process find uses similar to those described in U.S. Pat. 3,259,660, but are particularly useful as intermediates in the preparation of herbicidally active compounds.

This process provides an economical and efficient means of producing hydroxyaryl thioethers and intermediate sulfonium salts. The process can be easily employed on a commercial scale and utilizes inexpensive basic raw materials. The method first involves the formation of a phenyl sulfonium bisulfate by one of two means. The first entails reacting an organic sulfide with chlorine in the presence of sulfuric acid to form a chloro-sulfonium bisulfate, which, in turn, is reacted with a hydroxyaryl compound to form the phenyl sulfonium bisulfate. In the second method, dimethyl sulfoxide is allowed to react with a hydroxyaryl compound in the presence of sulfuric acid to form the phenyl sulfonium bisulfate. The crude reaction mixture prepared by either of these means is then allowed to react with water containing halide ions to effect decomposition and formation of the thioether. The use of sulfuric acid as a diluent and reactant in this process allows nitration of the aromatic moiety of the phenyl sulfonium bisulfate to be effected using nitric acid and optionally sulfuric acid without isolating the intermediate phenyl sulfonium bisulfate. An important advantage of this process is that in none of these steps do the intermediate products need to be isolated before proceeding to the next step.

Prior art.—The preparation of hydroxyaryl sulfonium chlorides has been discussed at length in U.S. Pat. 3,133,971 which discloses a process for preparing hydroxyaryl sulfonium chlorides by reacting a mixture of an organic thioether and a hydroxyaryl compound with chlorine, with or without an inert solvent system. U.S. Pat. 3,259,660 teaches that hydroxyaryl sulfonium chlorides can be prepared by reacting an organic thioether with chlorine either neat or, more effectively, in an inert solvent, then reacting the resulting crude reaction product with a phenol to form the desired sulfonium chloride. If it is desired to nitrate the aromatic portion of the hydroxyaryl sulfonium chloride formed in this manner, which utilizes an inert solvent, it is necessary to perform the rather cumbersome procedure of isolating the salt by precipitating and filtering before nitration of the ring can effectively take place. However, by reacting a sulfide and chlorine according to the method of this invention in the presence of sulfuric acid, to form a chlorosulfonium bisulfate which is then reacted with a phenol, a phenyl sulfonium bisulfate is prepared, which can then be nitrated directly as the crude reaction mixture without the intermediate step of isolating the phenyl sulfonium bisulfate. All that has to be done to effect the nitration is to mix nitric acid, and optionally sulfuric acid, with the crude reaction product obtained according to this invention. The fact that nitration of the ring can be carried out without isolation of the sulfonium salt makes this process extremely valuable for incorporation into other reaction schemes, such as the preparation of nitrated thioanisoles and derivatives thereof.

Prior art also teaches that in the production of 3-nitro-4-halophenyl ethers from a sulfonium salt it is necessary to react the sulfonium salt with perchloric acid (U.S. Pat. 3,159,683), or an aromatic sulfonic acid (U.S. Pat. 3,318,958), to form a salt which can be isolated then decomposed to form the thioether.

It is also generally known in the art that hydroxyaryl sulfonium perchlorates and sulfonates can be decomposed by refluxing in an aqueous salt solution.

SUMMARY OF THE INVENTION

It has now been discovered that hydroxyaryl thioethers can be inexpensively and easily prepared by the process indicated below: (The meanings of the symbols used are set out hereafter in the "Preferred Embodiments" section of this patent application.)

(a) reacting an organic sulfide of the formula R—S—R' with chlorine in the presence of sulfuric acid, to form chloro-sulfonium bisulfate of the formula

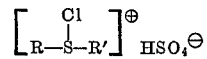

(b) reacting the resulting reaction mixture with a hydroxyaryl compound to form the corresponding phenyl sulfonium bisulfate of the structure:

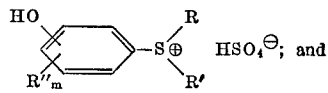

(c) reacting the resulting reaction mixture containing the phenyl sulfonium bisulfate with an aqueous solution containing halide ions to decompose the sulfonium salt and form the corresponding sulfide.

Alternatively, steps (a) and (b) may be replaced by the following step:

(d) reacting dimethylsulfoxide with a hydroxyaryl compound in the presence of sulfuric acid to form a phenyl dimethylsulfonium bisulfate.

If it is desired that the final product obtained by use of this process be a nitrated hydroxyaryl thioether, the crude reaction mixture from step (b) or (d), above, can be allowed to react with nitric acid and optionally additional sulfuric acid. Since sulfuric acid is a reactant and diluent in steps (a) and (d) and does not interfere with the nitration reaction (indeed, it is sometimes necessary for the nitration reaction to be effected), the phenyl sulfonium bisulfate does not have to be isolated before nitration will take place. In addition to nitrating phenyl sulfonium, bisulfates, phenyl sulfonium halides can be nitrated by means of the process of this invention as well. After the nitration reaction, the resulting reaction mixture (again, no isolation of the nitrated phenyl sulfonium bisulfated) is allowed to react as described in step (c) above, to form the nitrated hydroxyaryl thioether.

The following nitrated phenyl sulfonium bisulfate formed according to the process of this invention is novel:

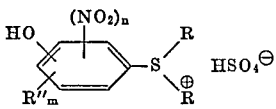

The process of this invention is an economical and efficient method for making the intermediate sulfonium bisulfate and hydroxyaryl thioethers and is easily adaptable to commercial scale. An importan advantage is that none of the intermediate products have to be isolated before continuing onto the next step; hence, it is unnecessary to convert the phenyl sulfonium bisulfates to another form, such as a perchlorate, in order to isolate it before decomposing it to form the hydroxyaryl thioether.

The use of sulfuric acid as a diluent in the step (a) of the process of this invention results in the formation of a chloro-sulfonium bisulfate of the formula

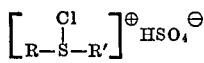

Thus far it has been extremely difficult to isolate this product and as yet it has not been done. It has been found, however, that the solutions of this chlorosulfonium bisulfate in sulfuric acid are thermally stable below 25° C. This stability is suprising in view of the instabilty of the analogous chloro-sulfonium chloride, of the formula

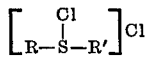

as disclosed in U.S. Pat. 3,259,660. In that patent it is said that due to such a product's relative instability at a temperature higher than 0° C. "which may lead to its hydrolysis to dimethyl sulfoxide or rearrangement to monochlorosulfide," it is preferable to react this "adduct" with the phenol a relatively short time after the adduct is prepared. Because a sulfuric acid solution of the chlorosulfonium bisulfate prepared according to the process of this invention is thermally stable at temperatures up to 25° C., it is not necessary to carry out the second stage of this process leading to the formation of the phenyl sulfonium bisulfate immediately after the chloro-sulfonium bisulfate has been prepared.

Similarly, the phenyl sulfonium bisulfate, prepared according to step (b) or (d) of the process of this invention, has also been extremely difficult to isolate, but, as in the case of the chloro-sulfonium bisulfate, above, a sulfuric acid solution of this product is also thermally stable, but in this case, at temperatures up to at least 50° C.

The stability of sulfuric acid solutions of these two intermediates offers certain operational advantages. For example, because of this stability the necessity of running step (b) immediately subsequent to the formation of the chloro-sulfonium bisulfate or of performing the nitration step immediately following the formation of the phenyl sulfonium bisulfate is obviated. Thus, on a commercial scale, this stability would allow operational difficulties such as a plant shutdown to be overcome without having to take special precautions to prevent the decomposition of the intermediates. For example, the chloro-sulfonium bisulfate formed in the first step can be produced and stored if the preparation of the phenyl-sulfonium bisulfate is delayed for some reason. Similarly, the phenyl-sulfonium bisulfate can be produced and stored if for some reason the next step of the reaction sequence is temporarily held up. After facilities are ready again, the intermediates can be utilized in their respective reactions. These advantages are even more attractive in light of the fact that the sulfuric acid solutions of the chloro-sulfonium bisulfate and phenyl-sulfonium bisulfate do not have to be treated or isolated from the crude reaction mixture. It will be appreciated, however, that since the phenyl-sulfonium bisulfate solution is more stable at higher temperatures than the chloro-sulfonium bisulfate solution, it is preferable to prepare and store a sulfuric acid solution of the former rather than the latter in a situation which forces storage of one or the other.

The evolution of hydrogen chloride gas in steps (a) and (b) of the process of this invention offers two advantages: (1) this gas is a readily available source of chloride ions which can be used in the decomposition step to effect the formation of the thioether; (2) since the gas is relatively insoluble in sulfuric acid, the evolution of the gas assists in the removal of heat from the reactions, effectively decreasing the exothermicity of the reactions.

DESCRIPTION OF THE PREFERRED EMBODIMENTS

The process of this invention is carried out by first reacting an organic sulfide with chlorine in the presence of sulfuric acid to form a chloro-sulfonium bisulfate, which in turn is reacted with a hydroxyaryl compound (a phenol) to form a phenyl sulfonium. The phenyl sulfonium bisulfate is then decomposed by refluxing in water containing a halide ion to form a hydroxyaryl thioether. If a nitrated thioether is desired, the resulting mixture containing the phenyl sulfonium bisulfate is reacted with nitric acid and optionally additional sulfuric acid, and this resultant mixture then decomposed by refluxing in water containing halide ions.

Generally, the organic sulfides suitable for use in the first reaction of this process comprise those having the general formula R—S—R', wherein R and R' are radicals selected from the group consisting of alkyl, halogenated alkyl, aryl, alkaryl, and aralkyl. Ilustrative of suitabe alkyl radicals are methy, ethyl, propyl, butyl, pentyl, hexyl, heptyl, decyl, dodecyl, pentadecyl, and substituted derivatives thereof, such as chloroethyl, chloropropyl and the like; of aryl radicals are phenyl, naphthyl and substituted derivatives thereof such as halophenyl and carbethoxyphenyl; of aralkyl radicals are benzyl, phenylethyl, and substituted derivatives thereof such as nitrophenylethyl; or alkaryl are methylphenyl, ethylphenyl, dimethylphenyl, butylphenyl and substituted derivatives thereof such as ethylbromophenyl. Especially suitable are dialkyl sulfides together containing from 2 to 10 carbon atoms such as dimethyl sulfide, diethyl sulfide, dipropyl sulfide, methyl ethyl sulfide, methyl octyl sulfide, ethyl propyl sulfide, and the like. The preferred organic thioether is dimethyl sulfide.

Chlorine can be added to the liquid reaction mixture as a liquid or a gas; preferably it is in the gaseous state.

The reaction of the sulfide with chlorine in the presence of sulfuric acid can be carried out in a homogeneous liquid medium or in a heterogeneous liquid medium, such as a slurry. However, for reaction rate, heat transfer and handling considerations, it is preferable that the reaction medium be a homogeneous liquid. The reaction proceeds according to the following reaction:

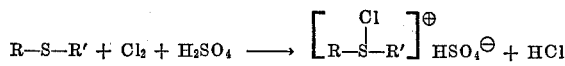

The concentration of the sulfuric acid can vary from 80 to 100 percent by weight (percent w.) or even fuming sulfuric acid (up to 65 percent w. $SO_3$ in $H_2SO_4$) without hindering the reaction. It is preferred, however, to use 90–100% w. sulfuric acid, whether nitration is to follow or not. To avoid problems of a two-phase system, it is also advantageous to use enough acid to keep the organic sulfide, hydroxyaryl compound and the resulting sulfonium salt in solution. The amount of sulfuric acid required will be dependent on the solubility of the intermediates, which is determinable by one skilled in the art. Another consideration is that the amount of the acid used should be sufficient to supply the bisulfate ion of the sulfonium salt. This will be a molar amount at least equal to that of the chlorine, and will preferably be in excess of that amount to insure a homogeneous reaction system. The mole ratio of sulfuric acid, if employed, to sulfide in the first step will be in excess of 1:1 and may be as high as 20:1 or more. However, the preferred mole ratio range is 2.0:1 to 10:1.

The reaction of the organic sulfide with chlorine according to the process of this invention is preferably carried out by providing a solution of the organic sulfide in sulfuric acid and introducing, with agitation, chlorine gas below the surface of the liquid in an amount not higher than required for the reaction with the sulfide. The reaction is carried out in a suitable vessel equipped with a means of agitation, addition facilities, a vent line, and cooling equipment. The mixture is allowed to react in a temperature range of about $-25°$ C. to $25°$ C., preferably between $-10°$ C. and $+10°$ C. Depending on the volume and nature of the reactants, feed rates, agitation and other factors, the time needed to complete the reaction may vary from several minutes to 10 hours or more. However, in a batch process, the reaction time of ½ hour to 5 hours is usually sufficient to complete the reaction. In general, the organic sulfide and chlorine are reacted in stoichiometric amounts with sulfuric acid; that is, equivalent molar amounts of the sulfide, chlorine and sulfuric acid are required for the formation of the same molar amount of the corresponding chloro-sulfonium bisulfate. To avoid undesirable side reactions in the first step, it is best to employ a slight excess of the sulfide over the chlorine. Accordingly, the mole ratio of sulfide to chlorine will be in excess of 1:1 and may be as high as 3:1. Still higher ratios may be employed if desired, although no particular benefits result therefrom. To minimize recovery problems, the preferred mole ratio of sulfide to chlorine is between 1.0:1 and 1.5:1. The reaction can be run at atmospheric or superatmospheric pressures.

As contemplated in this invention, a hydroxyaryl compound is an aromatic compound containing at least one —OH group substituted on the benzene ring, and having at least one unsubstituted reactive position in the aromatic ring. Suitable for use in the process of this invention are simple hydroxyaryl compounds, such as phenol and naphthol, or substituted phenols. Substituents may be hydroxy, alkoxy, alkyl, halogen, nitro, amino, cyano, carboxy, acyl, and acetamido. Illustrative of suitable substituted phenols are cresols, xylenols, alkylphenols such as ethylphenol, propylphenol, butylphenol and the like, naphthols, monohalophenols, dihalophenols, guaiacol, catechol, resorcinol, nitrophenols, dinitrophenols, cyanophenols, hydroxybenzoic acid, hydroxybenzaldehyde, hydroxybenzyl ethers such as hydroxybenzyl methyl ether, hydroxybenzyl ethyl ether, hydroxybenzyl butyl ether and the like, and alkoxyphenols such as ethoxyphenol, propoxyphenol, butoxyphenol and the like. It will be appreciated that the unsubstituted reactive position is ortho or para to the hydroxy group on the benzene ring. Eminently suitable for use in this process are phenol and the mono-substituted phenols such as cresol, resorcinol, guaiacol, cyanophenol, chlorophenol and the like. Phenol is preferred.

After a substantial amount of the chloro-sulfonium bisulfate is formed in the first step, the resulting reaction mixture is mixed with the hydroxyaryl compound and reacted to form the sulfonium salt. Generally, the hydroxyaryl compound and the product from the first step will be reacted in stoichiometric amounts (equimolar). However, to avoid undesired side reactions in the nitration step, if it follows, the phenol should be reacted with the reaction mixture of the first step in amounts somewhat less than the theoretical molar yield of the adduct formed in first step. If the nitration step is to follow, the mole ratio of the chloro-sulfonium bisulfate, based on chlorine, to the hydroxyaryl compound is preferably a little over 1.0:1, but may be as high as 2.0:1. Still higher ratios could be employed if desired, but no particular benefit would result therefrom and, in addition, recovery problems are minimized with lower mole ratios. The preferred mole ratio range of chlorosulfonium bisulfate, based on chlorine, to the hydroxyaryl compound is about 1.05:1 to 1:5:1. If, on the other hand, nitration of the phenol-sulfonium bisulfate is not to follow, a molar excess of phenol can be added with no adverse effect on the reaction. The mole ratio in this case may be from 1.0:1 to 2.0:1 or more with the preferred range being 1.0:1 to 1.5:1.

The reaction mixture from the first step can be added to the phenol in a different vessel, or the phenol can be added directly to the reaction mixture. The phenol can be added in the molten state for ease of handling and mixing. If the phenol is added in the molten state, however, consideration will have to be given for removal of the heat, since the reaction will be taking place at low temperature and that temperature will have to be maintained. It has been found that phenol containing up to 10% water can be advantageously employed in this reaction. The advantages of using phenol containing about 10% water is that it is readily available commercially and is a liquid at ambient temperatures, thus lending itself to easy handling. The water content does not interfere with the reaction either. The phenol may be added at once or at a controlled rate, the latter being preferable. This rate may vary from five minutes to several hours, depending on the volume of the reactants, the efficiency of the cooling equipment, and other factors. The temperature of this step of the process is best carried out between $-25°$ to $25°$ C., and preferably between $-10°$ and $10°$ C., for a time sufficient to produce a substantial amount of hydroxyaryl sulfonium salt. Depending on the volume and nature of the reactants, feed rates, agitation, and other factors, this time may vary from a few minutes to 10 hours or more. The reaction can be carried out at atmospheric or superatmospheric pressures.

Alternatively, the phenyl sulfonium bisulfate can be obtained by allowing dimethylsulfoxide to react with a phenol (of the type described above) in the presence of sulfuric acid. This results in the formation of a phenyl dimethylsulfonium bisulfate. The reaction can be carried out by adding dimethylsulfoxide and the phenol simultaneously to sulfuric acid or by mixing the phenol with the sulfuric acid, then adding the dimethylsulfoxide to the mixture. Because of the exothermicity of the reaction it is preferred that the dimethylsulfoxide be added at a rate at which the temperature can be controlled. The three reactants are generally allowed to react in stoichiometric quantities (equimolar). However, it is preferable to maintain an excess of sulfuric acid which may be a mole ratio of up to 20.0:1 or more of sulfuric acid to phenol. A mole ratio of acid to phenol of between 2.0:1 to 10:1 is preferred. The mole ratio of dimethylsulfoxide to phenol is slightly in excess of 1.0:1 and may be as high as 2.0:1, especially if nitration of the resulting phenyl sulfonium bisulfate is to follow. If so, a ratio between 1.0:1 and 1.5:1 is preferred. However, if nitration is not to follow this step, the phenol can be in excess of the dimethylsulfoxide. The temperature at which the reaction can be carried out is between −25° and 25° C., preferably between −10° and 10° C. The concentration of the sulfuric acid can vary from 80 to 100% w. or even fuming sulfuric acid (up to 65% w. SO₃ in sulfuric acid), but it is preferred to use 90 to 100% w. sulfuric acid. The phenol used can be 100% w. pure or can contain up to 10% w. water. Since phenol containing about 10% w. water is readily available commercially and is a liquid at ambient temperatures, for ease of handling, it is advantageous to use this material. Commercially available dimethylsulfoxide is suitable for use in this process.

The decomposition of the phenyl-sulfonium bisulfate formed by either of the above two methods to form a thioether is effected by mixing the crude reaction mixture containing the sulfonium salt with water containing halide ions such as chloride, bromide or iodide, and allowing to react preferably at reflux temperature. Because of the low cost and ready availability of sources thereof, the chloride ion is preferred. The chloride ions are available from several sources. A soluble salt such as sodium chloride, potassium chloride, and the like, is dissolved in water, and the resultant solution is refluxed with the reaction mixture. Another source of a chloride ion is the hydrogen chloride gas evolved in the formation of the chloro-sulfonium bisulfate and its subsequent reaction to the phenol according to the process of this invention. In the first step, since sulfuric acid is used as a diluent and coreactant, an equimolar amount of hydrogen chloride is evolved for each mole of the chlorosulfonium bisulfate formed. In the second step, for each mole of the phenylsulfonium bisulfate that is formed, one mole of hydrogen chloride gas is evolved according to the reaction

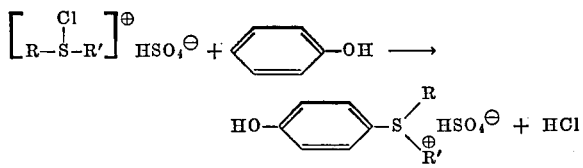

The hydrogen chloride evolved is easily utilized as a source of the chloride ion needed for the decomposition step merely by dissolving the hydrogen chloride gas in the water to be used for refluxing. Still another source is merely commercial hydrochloric acid. The ratio of chloride ions to the sulfonium salt may be as high as 10:1 or as low as 0.01:1, but it is preferable to be between about 0.5:1 and 2.0:1. The volume of water used can vary from a volume equal to or less than that of the reaction mixture to 20 times or more the volume of the reaction mixture. However, a volume of water which will result in an overall sulfuric acid concentration of 30–40% w. is preferred. The decomposition can be carried out at atmospheric or superatmospheric pressure.

A nitrated hydroxyaryl thioether can be obtained through the addition of a nitration step which utilizes nitric acid and, optionally, additional sulfuric acid to nitrate the phenyl sulfonium salt. The sulfonium moiety on the ring protects the sulfur from reacting, and the nitration of the ring can proceed unhindered and at low temperatures. The cumbersome process of isolating intermediate sulfonium salt is unnecessary since sulfuric acid is used as a diluent and reactant in the process and does not hinder the nitration. The overall process is as follows: (1) formation of the phenyl sulfonium bisulfate as previously described, (2) nitration of the aromatic moiety of the phenyl sulfonium bisulfate, and (3) formation of the thioether as previously described. It should be noted that phenyl sulfonium halides, in particular chlorides, can be nitrated as well as bisulfates, by this method.

The amount of nitric acid used in the nitration step will be dependent on the degree of nitration of the aromatic ring desired and the substituents on the ring. If mononitrated product is preferred, only 1 mole of nitric acid will be required per mole of the sulfonium compound, if a dinitrated product is desired, 2 moles will be needed. Since dinitration can occur quite readily, care must be taken to use no more than the stoichiometric amount needed for mononitration if so desired. It may even be necessary to employ a slight excess of the sulfonium compound if the dinitrated compound is to be excluded completely. If dinitration is desired it is preferable to use a slight molar excess of nitric acid to insure complete dinitration. Since trinitration will not be a concern in this process because of the difficulty of attachment of the third nitro group, the mole ratio of nitric acid to hydroxyaryl sulfonium bisulfate may be as high as 3:1, but 2.0:1 to 2.5:1 is preferred. The yields of the nitrated phenyl sulfonium bisulfate are good if 93–100% w. or even fuming sulfuric acid is used, but best results occur as long as the concentration of the sulfuric acid is between 93 and 100% w. at the end of the nitration reaction. Determination of the concentration of the sulfuric acid by is found by dividing the free 100% w. sulfuric acid by free 100% w. sulfuric acid plus the amount of water present. The free 100% w. sulfuric acid is defined as the total 100% w. sulfuric acid added to the system minus the amount utilized to form the phenyl sulfonium bisulfate. The concentration of the nitric acid may vary from between 50% w. to 100% w., with the preferred concentration being between 75% w. to 95% w. The mole ratio of 100% w. sulfuric acid to 100% w. nitric acid can be between 1.0:1 to 20:1; however, the range of between 2.0:1 to 10:1 is preferred. The reaction temperature is maintained at between −10 and +70° C., with the preferred temperature range being about 0° C. to 50° C. Depending on the volume and nature of the reactants, feed rates, agitation, and other factors, the time for the completion of the reaction may vary from a few minutes to 10 hours or more. This step can be carried out at atmospheric or superatmospheric pressures.

The formation of the phenyl sulfonium bisulfate can also be carried out by placing the sulfide, phenol and sulfuric acid in the reaction vessel, then adding the chlorine; however, higher yields result from first reacting the sulfide with chlorine in sulfuric acid to form the chlorosulfonium bisulfate, then reacting this with the hydroxyaryl compound in sulfuric acid to form the phenyl sulfonium bisulfate.

The following examples are used to further explain this invention:

Example I.—Preparation of 2-hydroxy-4-methylphenyl methyl sulfide 35 grams (g.) of dimethyl sulfide were stirred and dissolved in 110 milliliters (ml.) 96 percent by weight (percent w.) sulfuric acid between 10° and 25° C. The solution was cooled to 0° C. and 35.5 g. of chlorine was introduced as a gas below the surface of the solution over a period of a half hour while the solution was constantly stirred and the temperature was kept at 0° C. During this reaction HCl gas evolved. To the resulting mixture 50 g. of liquid p-cresol was added in 30 minutes, again with constant stirring at 0° C. Stirring was continued for another hour, while the mixture was allowed to warm the ambient temperature. Again HCl gas was evolved during this reaction. The mixture was then poured into a solution of 120 g. sodium chloride in 800 g. water and boiled overnight. The organic layer was separated from the aqueous phase and the aqueous layer was then extracted with three 50 ml. portions of methylene chloride which were then combined with the original organic phase. The combined organic phases were dried over sodium sulfate, and then were subjected to distillation under reduced pressure. 68.1 grams of product was obtained which was confirmed by analysis to be 2-hydroxy-5-methylphenyl methyl sulfide.

Example II.—Preparation of 4-hydroxy-3,5-dinitrophenyl methyl sulfide 1.1 moles of dimethyl sulfide were dissolved at 0° C. in 220 ml. of 96% w. sulfuric acid and placed in a vessel equipped with a means of agitation, temperature indicator, addition funnel, cooling system, and vent line. Subsequently, 1.0 mole of chlorine gas was introduced below the surface of the solution at −15° to −10° over a period of 45 minutes. The reaction mixture was stirred constantly throughout the reaction, which was slightly exothermic. Hydrogen chloride gas (HCl) was evolved during the reaction. To the resulting clear solution, 0.87 mole melted phenol was added with stirring and cooling, over a 45-minute period. After about ⅓ of the phenol was added, HCl again started to escape at a temperature of −10° to −15° C. This resulting reaction mixture containing the 4-hydroxyphenyl dimethyl sulfonium bisulfate was allowed to warm to about 20° C. over a two-hour period.

This solution was then cooled to 0° C. 240 ml. of 30% fuming sulfuric acid was added, whereupon the nitration was started by addition of a mixture of 100 ml. of 90% w. nitric acid (22.25 moles) and 240 ml. 30% fuming sulfuric acid. During the addition (1.5 hours), the temperature was kept at 0–5° C. by external cooling. After the addition was complete, the mixture was stirred for one hour during which time the temperature was allowed to rise to 30° C. Subsequently the mixture was poured into 3.5 liters of water which contained 700 g. of sodium chloride, and was boiled for two hours. Before the sulfonium compound strated to decompose into 4-hydroxy-3,5-dinitrophenyl methyl sulfide (compound I) nitrogen dioxide fumes were evolved. The resulting dark red oil which formed during the refluxing crystallized upon cooling to room temperature. Filtration gave, after drying, 195.4 g. (0.852 mole) compound I, melting point 100–103° C. (pure product 102–103° C.) in a yield of 98% based on phenol.

Example III.—Preparation of 4-hydroxy-3,5-dinitrophenyl dimethyl sulfonium 1.05 mole of dimethylsulfide was dissolved at 20° C. in 213 ml. of 96% w. sulfuric acid and placed in a vessel equipped with a means of agitation, temperature indicator, addition funnel, cooling system and vent line. Subsequently, 0.99 mole of chlorine gas was introduced below the surface of the solution at −5 to 0° C. over a period of 30 minutes. The reaction mixture was stirred constantly throughout the reaction which was slightly exothermic and during which time HCl was evolved. To this resulting clear solution 0.96 mole melted phenol was added over a 45 minute period, during which time the mixture was stirred and maintained by external cooling at −5 to 0° C. The resulting reaction mixture was allowed to warm to room temperature over a two-hour period.

The solution was then cooled to 0° C. 126 ml. of 65% fuming sulfuric acid was added, whereupon the nitration was started by addition of 95 ml. of 90% nitric acid (2.03 mole). The first mole was added at 25° C. over a 30-minute period, the second mole between 40 and 50° C. for the same amount of time. The reaction mixture was kept at 50° C. for another hour.

A sample was taken (36.0 g., 3.8% of total amount) and mixed with 100 ml. methanol under external cooling. Subsequently, 250 ml. diethyl ether is added after seeding the solution with seed crystals of 4-hydroxy 3,5-dinitrophenyl dimethylsulfonium bisulfate. A pale yellow precipitate is formed which was isolated by filtration. Yield: 12.0 g. (97.5% m on phenol) M.P.: 170–172° C. The material was identified by elemental analysis and independent synthesis as 4-hydroxy-3,5-dinitrophenyl dimethyl sulfonium bisulfate.

Example IV.—Preparation of 4-hydroxy-3,5-dinitrophenyl methyl sulfide using dimethylsulfoxide 18.8 g. of phenol were stirred and partially dissolved in 44 ml. of concentrated sulfuric acid at 0° C. (The phenol did not dissolve completely at this temperature.) To this mixture 16.0 g. of dimethylsulfoxide were added dropwise over a period of 15 minutes while the reaction mixture was stirred and cooled to maintain the temperature at 0° C. The reaction mixture was then stirred for two hours while it warmed to room temperature. (Some small pieces of phenol were still visible.) At this point the crude reaction mixture contained the 4-hydroxyphenyl dimethylsulfonium bisulfate.

40 ml. of fuming sulfuric acid (33% w. SO₃, approximately 0.3 mole SO₃) were added to the reaction mixture, whereupon the temperature increased to 60° C. After cooling the resulting mixture down to 0° C., a mixture of 20.5 ml. of 90% w. nitric acid and 40 ml. 30% w. fuming sulfuric acid was added dropwise over a 30-minute period while the reaction mixture was constantly stirred and kept below 7° C. by external cooling. After the nitric acid/sulfuric acid mixture was added, the resulting reaction mixture was stirred for another 30 minutes at 10°–20° C. then poured into 700 ml. water to which 300 g. of sodium chloride were then added. This mixture was heated to boiling and refluxed for two hours.

The resulting mixture was comprised of an aqueous phase and an organic phase (a red oil). The mixture was allowed to cool to room temperature overnight whereupon the red oil formed red crystals. The reaction mixture was extracted 3 times with 150 ml. of chloroform and the chloroform extract was then dried over magnesium sulfate. The chloroform was evaporated under vacuum and the resulting red crystals were analyzed by thin-layer chromatography to be pure 4-hydroxy-3,5-dinitrophenyl methyl sulfide.

Following procedures similar to those indicated in Examples I–IV, similar hydroxyaryl thioethers or sulfonium bisulfates can be obtained by using the organic sulfides previously mentioned, such as diethyl sulfide, methyl ethyl sulfide, and the like, in place of dimethyl sulfide. In place of the phenol and cresol can be substituted any of the hydroxyaryl compounds described heretofore in this specification.

We claim as our invention:

1. A process for the preparation of a hydroxyaryl thioether which comprises (a) reacting a mixture of an organic sulfide of the formula R—S—R', wherein R and R' each independently is alkyl, halogenated alkyl, aryl, alkaryl or aralkyl and sulfuric acid with chlorine to form a chloro-sulfonium bisulfate of the formula

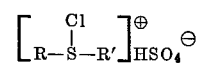

(b) reacting the resulting crude reaction mixture from (a) with a hydroxyaryl compound to form a hydroxyaryl sulfonium bisulfate of the formula

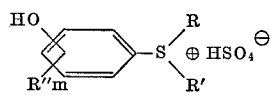

wherein R and R' are previously defined, m is an integer between 0 and 2, inclusive, and R" is —OH, halogen, —NH₂, —NO₂, —NHCOCH₃, —C≡N, —COOH, —CHO, or alkyl, alkoxy or carbonyl of from 1 to 4 carbon atoms;

(c) reacting the resulting reaction mixture from (b) with an aqueous solution containing halide ions to form the thioether of the formula

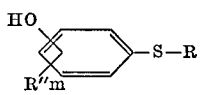

where R, R'' and m are defined above.

2. The process according to claim 1 wherein R and R' are alkyl together containing from 2 to 10 carbon atoms, R'' is alkyl of from 1 to 4 carbon atoms, the halide ions are chloride and m is 0 to 1.

3. The process according to claim 2 wherein R and R' are each methyl, m is 0 and —OH is para to the position at which S is attached to the aromatic ring.

References Cited
UNITED STATES PATENTS

| | | | |
|---|---|---|---|
| 3,196,184 | 7/1965 | Berry | 260—609 F |
| 3,732,317 | 5/1973 | Pilgram et al. | 260—607 B |

LEWIS GOTTS, Primary Examiner

D. R. PHILLIPS, Assistant Examiner

U.S. Cl. X.R.

260—465 F, 520, 551 R, 607 B